United States Patent [19]
Russell et al.

[11] 3,842,215
[45] Oct. 15, 1974

[54] PRIVATE BRANCH EXCHANGE OPERATOR TRUNK GROUP SELECTION MEANS

[75] Inventors: Stanley L. Russell, Webster; Klaus Gueldenpfennig, Penfield; Uwe A. Pommerening, Webster, all of N.Y.

[73] Assignee: Stromberg-Carlson Corporation, Rochester, N.Y.

[22] Filed: Mar. 30, 1973

[21] Appl. No.: 346,561

[52] U.S. Cl. ................................................ 179/27 D
[51] Int. Cl. ........................................... H04m 3/00
[58] Field of Search ......... 179/27 CA, 27 D, 27 FF, 179/18 HA, 18 AD

[56] References Cited

UNITED STATES PATENTS

| | | | |
|---|---|---|---|
| 3,627,956 | 12/1971 | Gueldfenpennig et al. | 179/27 CA |
| 3,643,034 | 2/1972 | Burns et al. | 179/27 D |
| 3,721,770 | 3/1973 | Beidez et al. | 179/27 D |
| 3,769,462 | 10/1973 | Russell et al. | 179/18 AD |
| 3,780,227 | 12/1973 | Pirnie, Jr. et al. | 179/6 C |

*Primary Examiner*—Kathleen H. Claffy
*Assistant Examiner*—Mitchell Saffian
*Attorney, Agent, or Firm*—Howard R. Greenberg; William F. Porter, Jr.; Edward A. Gerlaugh

[57] ABSTRACT

In a private branch exchange wherein any one of a plurality of trunks is connectable to any one of a plurality of operator consoles by a common control means, the trunks are arranged in serviceable groups and means are provided for enabling each PBX operator to select which trunk groups to service.

5 Claims, 3 Drawing Figures

PRIVATE BRANCH EXCHANGE OPERATOR TRUNK GROUP SELECTION MEANS

BACKGROUND OF THE INVENTION

The present invention concerns telephone private branch exchanges (PBX) generally and particularly a means for enabling PBX operators to select which type of trunks to service.

In older private branch exchanges having more than one PBX operator for handling the telephone traffic, each operator is normally assigned one or more type calls to handle, necessitated by the system design wherein trunks are connected directly to the operator consoles. In large exchanges having many trunks it is not practical to connect each and every trunk to all consoles and so it is necessary to distribute the trunks among the consoles. This means that each operator can service only those trunks connected to the associated console and none of the trunks not connected to the console. Consequently there is not much flexibility for an operator whose trunk traffic may be light at a particular time to assist other operators whose trunk traffic may be heavy at that time. This of course leads to inefficiency in handling telephone traffic, thereby delaying the servicing of calls which detracts from the quality of service.

The foregoing problem is overcome by some modern private branch exchanges which have a common control means for connecting any one of the trunk circuits to any one of the consoles so that an operator need not be limited to the type of call to be serviced. Such an exchange is described in a copending application entitled, "Private Automatic Branch Exchange" (Ser. No. 293,518) which has the same inventorship and assignee as the present application. Although these exchanges provide greater flexibility for more evenly distributing the telephone traffic among the PBX operators they do not permit the operators to select which type calls to service and not to service. Such selectivity would materially improve an operator's efficiency and effectiveness by permitting the operator to increase or reduce the type and/or number of calls being routed to the console in accordance with the operator's own immediate traffic demands as well as the demands on the other operators.

With the foregoing in mind, it is an object of the present invention to provide a means for easily and conveniently modifying a common control type of private branch exchange wherein any one of a plurality of trunk circuits is connectable to any one of a plurality of operator consoles whereby each console operator can select which trunk circuit group to service.

It is a further object of the present invention to provide such a means which responds easily and quickly to operator commands to include or exclude trunk circuit groups to be serviced by the operator in accordance with changing telephone traffic demands.

BRIEF DESCRIPTION OF THE INVENTION

Figure 1:
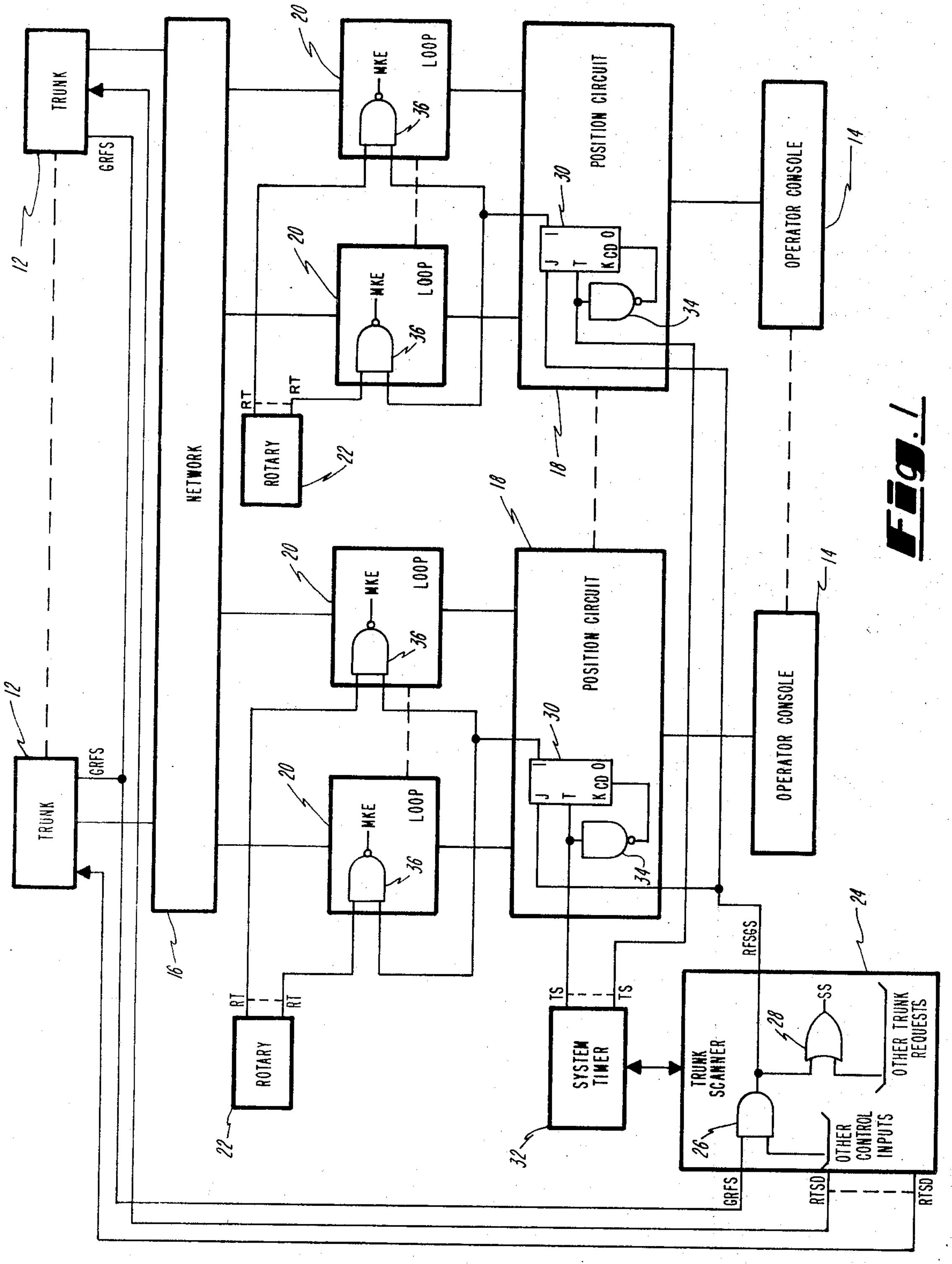
FIG. 1 is a block diagram of the relevant portion of a typical private branch exchange to which the invention applies.

The operator trunk group selection means is intended to function with a telephone private branch exchange having a plurality of trunk circuits any one of which is connectable to any one of a plurality of operator consoles, each console being attended by a single operator and having an individual control circuit for controlling connections thereto and some common control means for interconnecting a trunk with a console. Generally the common control means effectuates each connection in response to an operator service request signal from the trunk reguesting service, the signal being applied by the common control means to the control circuits to enable them to establish a connection from the trunk to their respective consoles.

The operator trunk group selection arrangement provides means for arranging the trunk circuit request leads over which request signals are received from the trunks in desired or serviceable groups, with each group having an individual lead for passing on request signals from any request leads within the group. In one embodiment the group leads are connected directly to the control circuits, with each lead terminating at one input of a different one of a plurality of gating circuits in each of the control circuits. Each gating circuit has a second input connected to a different one of a plurality of keys on the associated operator console for enabling the gate to pass request signals on its group lead input when the key is actuated by the console operator, to permit the control circuit to respond to the request signals from the common control means. Each key corresponds to a different trunk group for enabling the operator to choose whether or not to service the trunks within the group. When a key is not actuated connection requests from trunks within the group are not passed onto the control circuit so that a connection to the associated console is not possible. It is only when a gating circuit is fully enabled by the coincidence of two signals, namely one from an actuated key connected thereto and the second from the connected group request lead that the control circuit is enabled to respond to a trunk request from the common control means for effectuating a connection.

In a second embodiment the group request leads are connected to the control circuits indirectly through the common control means.

DETAILED DESCRIPTION OF THE INVENTION

Although the operator trunk group selection means dislosed herein is compatible with any private branch exchange wherein any one of a plurality of trunk circuits is connectable to any one of a plurality of operator consoles through some common control means, the invention may be most easily described in the context of a specific system. Accordingly, the invention will be presented in connection with the PBX which is described in detail in the copending application already referred to under "Background Of The Invention." Other relevant copending applications for the same inventors and assignee are, "Private Automatic Branch Exchange Service Circuit Complex" (now U.S. Pat. No. 3,769,462) which describes the overall system operation, particularly the common control means regarding calls outside the PBX and "Operator Loop Complex" (Ser. No. 293,752), now U.S. Pat. No. 3,816,665, which details the operations for establishing telephone connections to the PBX operators via the operator consoles. The latter will now be briefly described with reference to FIG. 1 which shows the relevant portion of the system in block form. To facilitate the reader's understanding with regard to the aforementioned cross references, the same terminology used therein will be employed throughout the present application.

As shown in FIG. 1 the PBX has a plurality of trunk circuits 12, which may be of various types, and a plurality of operator consoles 14 with a multistage network 16 for connecting any trunk circuit 12 to any console 14. Each console is attended by an individual PBX operator. Each connection to an operator console 14 is made through and under the control of an individual position circuit 18 associated therewith and one of a plurality of loop circuits 20 associated with the position circuit 18. Each position circuit 18 and its associated loop circuits 20 comprise a control circuit dedicated to an individual console 14 for receiving and responding to supervisory and control signals from both the system and the PBX operator of the console necessary for establishing and maintaining connections thereto. An individual rotary 22 is provided for each group of loop circuits 20 for preselecting an idle one via leads RT for servicing the next connection request to be received.

Connection requests are detected and processed by a trunk scanner 24 which continuously scans the trunk circuits 12 by sequentially applying scanning pulses thereto via the leads marked RTSD (regular trunk scanner decoder). The trunks 12 are designed so that a trunk circuit 12 seeking connection to an operator console 14 generates an operator service request signal, indicating the same, only when addressed (scanning pulse applied thereto) by the trunk scanner 24. This permits only one request signal to be generated at a time assuring an orderly servicing of requests in sequential order, with each request being processed before the trunk scanner 24 goes onto the next request. The operator service request signals from the trunks 12 are applied to the trunk scanner 24 over a common bus marked GRFS (general request for service). The signals are applied to one input of an AND gate 26 which has other control inputs, the functions of which are not important to an understanding of the present invention. These functions are explained in detail in the second copending application previously alluded to. Assuming that enabling signals are present on all the other control inputs, the presence of a request signal on the GRFS lead fully enables gate 26 to generate a signal at its output which is applied to one input of an OR gate 28 in the trunk scanner 24 and the J input of a flip-flop 30 in each of the position circuits 18. The OR gate 28 generates a signal SS (stop scan) at its output which is used to stop the scanning operation at the addressed trunk 12 generating the operator service request signal to provide sufficient time for the network 16 to effectuate a connection between that trunk requesting service and an operator console 14. Since the trunk scanner 24 services all trunk request including those for other than an operator (e.g., a register for DID calls), the OR gate 28 has other inputs corresponding to these other requests for stopping the scanning operation when required. With the fully enabled output of gate 26 applied to the J inputs of flip-flops 30 via the lead marked RFSGS (request for service-general service), the flip-flops 30 will be set (a high signal at their 1 output) when a negative going pulse is applied to their T (toggle) inputs. Although the system could easily be designed to allow the requesting trunk to be connected to all position circuits 18 so that any operator could handle the call, the system is in fact designed to connect the requesting trunk to only one position circuit 18, thus routing the call to the operator attending the associated operator console 14. This is accomplished by a system timer 32 which sequentially applies timing pulses (called enabling time slots) on the leads marked TS to the T inputs of the flip-flops 30 so that the first one toggled following the presence of an enabling signal on the RFSGS lead will be set thereby permitting its position circuit 18 to respond to the operator service request if there is an idle loop 20 available. The timing pulse is sufficiently long (10 ms) to permit the completion of a trunk connection to the loop circuit 20 (at which time a visual and/or audible signal at the console apprises the operator of the call) before the timing pulse is applied to the next position circuit 18. Upon completion of the connection the operator service request signal is removed so that double connections are not possible. A set flip-flop 30 is reset at the end of the timing pulse via the CD (clear direct) input through an inverter 34. In addition to the foregoing, the system timer 32 provides other timing pulses to the rest of the system, including the trunk scanner 24, for synchronization and supervisory purposes as well as for control purposes.

The 1 output of each flip-flop 30 is connected to one input of a NAND gate 36 in each of the loop circuits 20 associated with its respective position circuit 18. Consequently, when a flip-flop 30 is set it partially enables the gates 36 to generate an MKE (mark enable) signal at their outputs. Each of the gates 36 has a second input connected to a separate RT lead from the rotary 22 which applies an enabling signal on only one RT lead at a time. The gate 36 connected to the enabled RT lead will be the only one fully enabled to generate an MKE signal. The gate's respective loop circuit 20 is the one preselected by the rotary 22 for servicing this particular connection. Once the loop circuit 20 becomes part of the connection H is made busy, which permits the rotary 22 to advance to the next idle loop circuit 20 to pre-select it for the next request. The generation of the MKE signal causes the NAND gate's respective loop circuit 20 to apply a mark signal (not shown) to the network 16 which together with a mark signal from the requesting trunk 12 is used during the system path finding operation to interconnect the two through the network 16. The position circuit 18 and its associated console 14 are automatically interconnected while the position circuit 18 is connected to a particular loop circuit 20 by the actuation of a key on the console 14 associated with that loop circuit. Thus, the loop circuit 20 acts as an interconnection link between the requesting trunk circuit 12 and the console 14 via the position circuit 18 so that once a path through the network 16 is completed the console 14 and trunk 12 are interconnected when the operator pushes the loop key. Since the position circuit 18 and operator console 14 are connected together the trunk circuit 12 is automatically connected.

Figure 2:
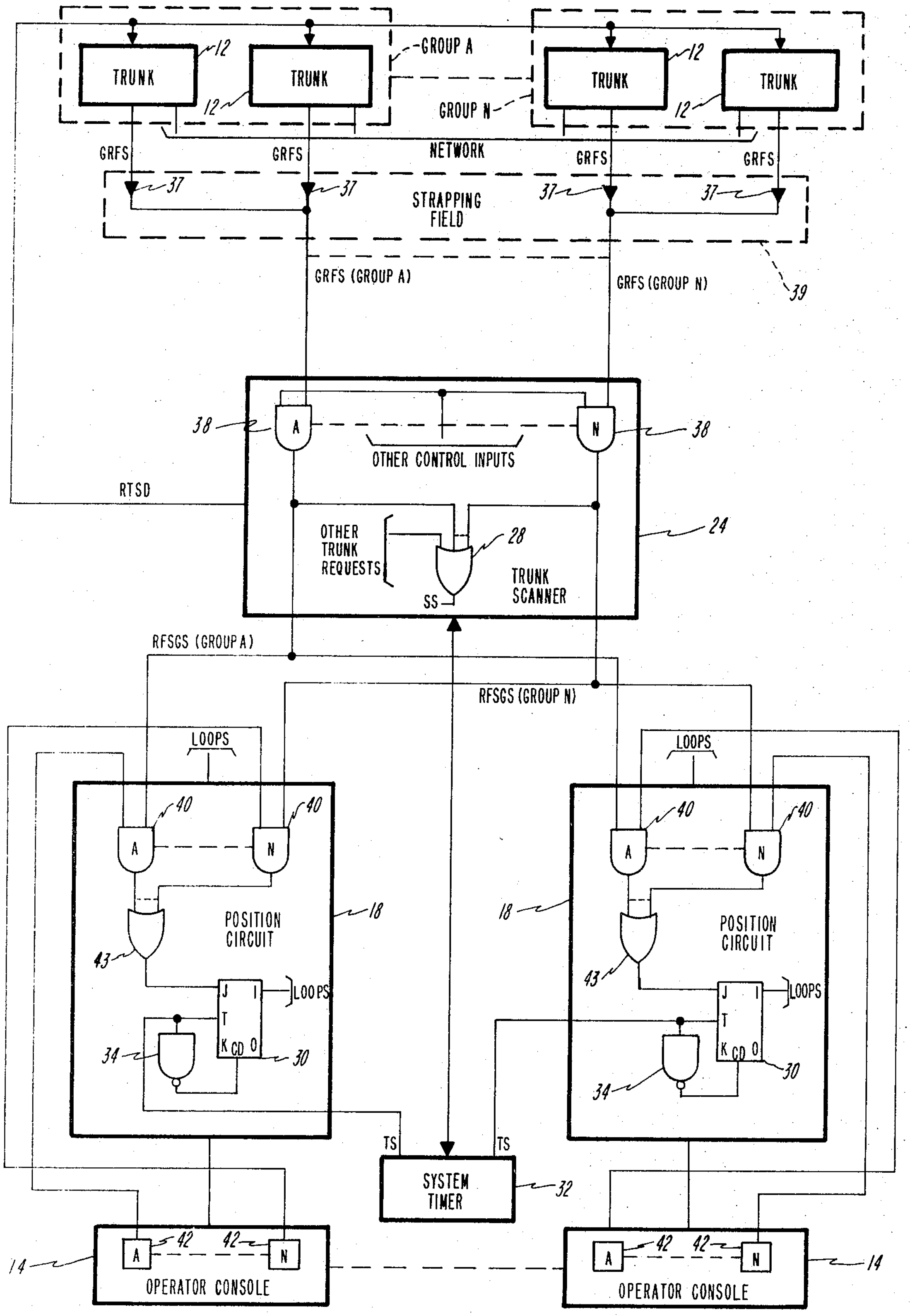
FIG. 2 shows the private branch exchange of FIG. 1 as modified by the addition thereto of the operator trunk group selection means.

FIG. 2 shows modifications to the PBX of FIG. 1 for permitting the PBX operators to select which trunks to service. The trunks 12 are arranged in groups A–N in any desired fashion and number, each group providing a single entity of trunk circuits which an operator can choose to service or not. The GRFS leads from the trunks in each group are combined via isolating diodes 37 into a single GRFS lead for the group, designated GRFS (Group A) — GRFS (Group N) whereby when a trunk circuit 12 requesting service in any group is addressed by the trunk scanner 24 via the RTSD lead (one being shown only for convenience), it still generates an operator service request signal which is passed onto its associated group lead. In other words, any time a trunk circuit 12 puts out a service request signal, it appears on its associated group request lead. Now this could obviously be done by hard-wiring each group lead to the request leads from the trunks within its group as shown in FIG. 2. However, this would lack flexibility for easily and conveniently rearranging the distribution of trunk circuits into groups when required (for instance as the system expands) since many GRFS lead wires would have to be reconnected each time a revamp was necessitated. A more practical approach is to use a strapping field 39, shown as an optional element in FIG. 2, which is a well known device for connecting different electrical paths together via connecting leads in the strapping field. If one wishes to connect different paths together, in order to regroup the trunks, then it is only necessary to replace the strapping field with one providing the proper connection patterns. With the prevalence of printed circuit cards in modern telephone technology, the strapping field can be provided on a printed circuit card which is easily inserted and removed at will.

As shown in FIG. 2, the operator service request signals are no longer applied to the trunk scanner 24 directly from the individual trunk leads GRFS but rather from the group request leads GRFS (group). In lieu of the individual AND gate 26 in the trunk scanner 24 of FIG. 1, is a plurality of AND gates 38 (A–N), there being one for each group request lead, as indicated by the letter designation. Instead of a single RFSGS output from the trunk scanner 24, as before, there are now a plurality of such outputs designated RFSGS (Group A) — RFSGS (Group N). The operation of the trunk scanner is the same as before except that whereas before the output request signals were on a single RFSGS lead for any trunk request, now each output signal appears on the RFSGS (group) lead corresponding to the group in which the trunk requesting operator service is located.

Looking to the position circuits 18, it will be seen that they have been modified so that each includes a plurality of AND gates 40 (A–N), each having an input connected to a different one of the RFSGS (group) leads. Each AND gate 40 has a second input connected to a different one of a plurality of keys 42 (A–N) on the operator console 14 associated with its respective position circuit 18. When a key 42 is actuated by manual depression it applies an enabling signal to its connected AND gate 40 to partially enable the gate to pass to its output signals on its RFSGS (group) input lead. The outputs of the AND gates 40 in each position circuit 18 are all connected to the J input of the associated flip-flop 30 through an OR gate 43 so that the flip-flop 30 is set by an output signal from any fully enabled one of those AND gates 40. The operations following the setting of the flip-flop 30 for effectuating a connection are exactly the same as previously described. A flip-flop 30 can be set to generate an MKE signal only upon the coincidence of two conditions at any one gate 40, namely a request signal on its RFSGS (group) lead indicating that a trunk in the corresponding group is requesting service and an enabling signal on its key 42 lead indicating that the operator wishes to service trunks in that group. In this regard it should be remembered that there can be a request signal only on one RFSGS (group) lead at a time, corresponding to the group in which the trunk requesting service is located, since only one trunk connection is serviced at a time. If a key 42 corresponding to a particular group is not actuated, then the associated position circuit 18 is inhibited from responding to signals on the associated RFSGS (group) lead, since signals thereon will not be passed onto the flip-flop 30 to set it to generate an MKE signal. Consequently a trunk connection cannot be established.

Figure 3:
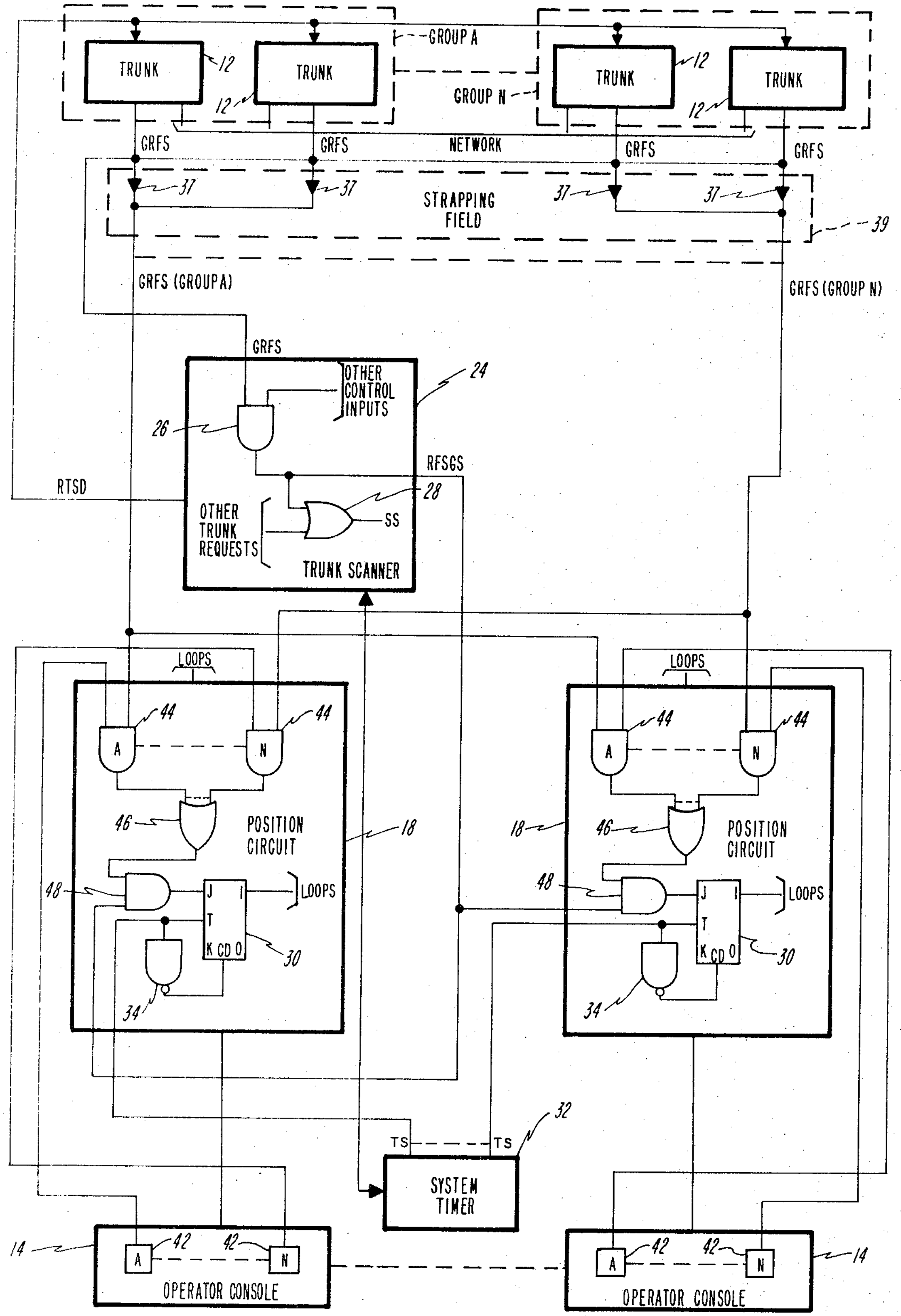
FIG. 3 shows an alternative embodiment of the operator trunk group selection means in the private branch exchange of FIG. 1.

An alternative embodiment of the invention, not requiring modification of the trunk scanner is shown in FIG. 3. The trunk request leads GRFS are combined as in the first embodiment to provide a single group request lead GRFS (group) for each group with a request signal being applied to the group lead whenever a trunk within the group puts out a request signal. Each position circuit 18 has a plurality of AND gates 44, each having an input connected to a different GRFS (group) lead. Each of the plurality of gates 44 has a second input connected to a different one of the plurality of keys 42 (A–N) on the associated operator console 14. The arrangement is the same as previously described with a gate 44 being fully enabled by the coincidence of the key and request signals at its inputs. The outputs of the gates 44 are applied through an OR gate 46 to one input of an AND gate 48 whose output is connected to the J input of flip-flop 30. A second input of gate 48 is connected to the RFSGS lead of the trunk scanner 24. It will be readily seen that any request signal appearing on this lead will only be applied to a flip-flop 30 to set it if the associated AND gate 48 is partially enabled to pass the signal in response to one of the gates 44 being fully enabled. A gate 44 will be fully enabled only if the key 42 corresponding to the group containing the trunk requesting service is actuated to apply an enabling signal thereto. It is thus seen that a position circuit 18 is enabled to respond to a trunk request by the coincidence of this signal, namely an RFSGS and GRFS (group) which are derived simultaneously from the requesting trunk and an enabling signal from the key 42 corresponding to the trunk group.

The foregoing invention affords a simple and expedient means for modifying private branch exchanges of the type exemplified herein to enable PBX operators to easily and conveniently select which trunks to service in accordance with the various truck groups provided and changing traffic demands. So long as an exchange is characterized by a plurality of trunks and a plurality of operator consoles with some common control means for interconnecting any trunk with any console, the trunk group selection means taught herein may be readily modifed to be adaptable to any specific system by one familiar with the art without departing from the scope and spirit of the invention. For this reason the specific embodiments described are intended to be merely illustrative and not restrictive of the invention except as claimed hereinbelow.

What is claimed is:

1. In combination with a private branch exchange having a plurality of trunk circuits, any one of which is connectable to any one of a plurality of operator consoles, each console having an individual control circuit for controlling connections thereto under the control of a common control means which detects operator service request signals via request leads from the trunk circuits, there being one signal generated at a time, the common control means applying each detected signal to the control circuits to enable the requesting trunk to be connected thereto, operator trunk group selection means for affording console operators selectivity in servicing trunk circuits, comprising:

means for arranging the trunk circuit request leads in serviceable groups to provide an individual request lead for each group for passing on service request signals from any trunk lead within the group;

a plurality of gating circuit means for each control circuit, each gating circuit means being connected to a different one of the group request leads for receiving request signals thereon, and a plurality of keys for each console, each key being associated with a different gating circuit means of the associated control circuit for applying an enable signal thereto, only when actuated, to permit said gating circuit means to pass request signals on its connected group request lead for enabling said associated control circuit to respond to operator service request signals from trunks in the corresponding group via the common control means.

2. The operator trunk group selection means of claim 1 wherein the common control means includes a trunk scanner for sequentially scanning the trunk circuit request leads for service request signals, whereupon detecting a service request signal the scanner stops its scanning operation and applies the request signal to the control circuits.

3. The operator trunk group selection means of claim 2 wherein the common control means includes a system timer for sequentially applying timing pulses to the control circuits whereby a control circuit is enabled to respond to a service request signal from the scanner only when a timing pulse is applied thereto.

4. In combination with a private branch exchange having a plurality of trunk circuits, any one of which is connectable to any one of a plurality of operator consoles, each console having an individual control circuit for controlling connections thereto and a trunk scanner for sequentially scanning the trunk circuit request leads to detect operator service request signals therefrom whereupon detecting a service request signal the scanner stops its scanning operation and applies the request signal to the control circuits to enable the requesting trunk to be connected thereto, operator trunk group selection means for affording console operators selectivity in servicing trunk circuits, comprising:

means for arranging the trunk circuit request leads to the trunk scanner in serviceable groups to provide an individual request lead to the trunk scanner for each group over which a service request signal is transmitted in response to any service request signal from within the group trunk scanner means, including a plurality of output signal leads, each being associated with a different group request lead arranged so that the trunk scanner applies a service request signal to an output signal lead whenever the associated group request lead has a service request signal thereon;

a plurality of gating circuit means for each control circuit, each gating circuit means being connected to a different one of the output signal leads for receiving request signals thereon, and a plurality of keys for each console, each key being associated with a different gating circuit means of the associated control circuit for applying an enable signal thereto, only when actuated, to permit said gating circuit means to pass request signals on its connected output signal lead from the trunk scanner for enabling aaid associated control circuit to respond to said request signals.

5. The operator trunk group selection means of claim 4 including a system timer for sequentially applying timing pulses to the control circuits whereby a control circuit is enabled to respond to a service request signal only when a timing pulse is applied thereto.

* * * * *